Aug. 11, 1931.                H. E. MAYNARD                1,818,565
                                BRAKE SHOE
                            Filed May 23, 1928
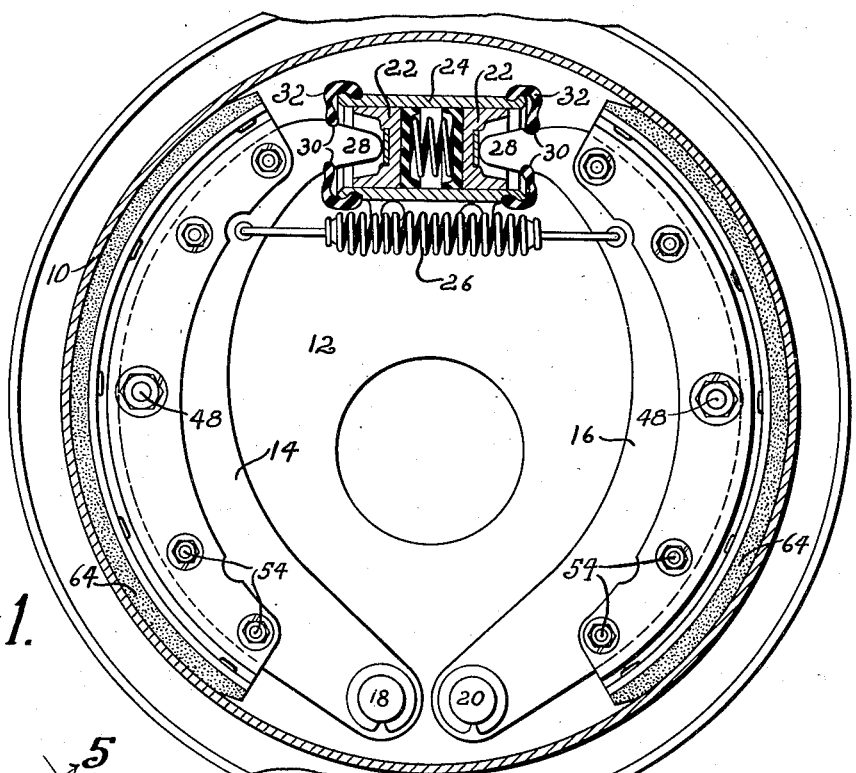
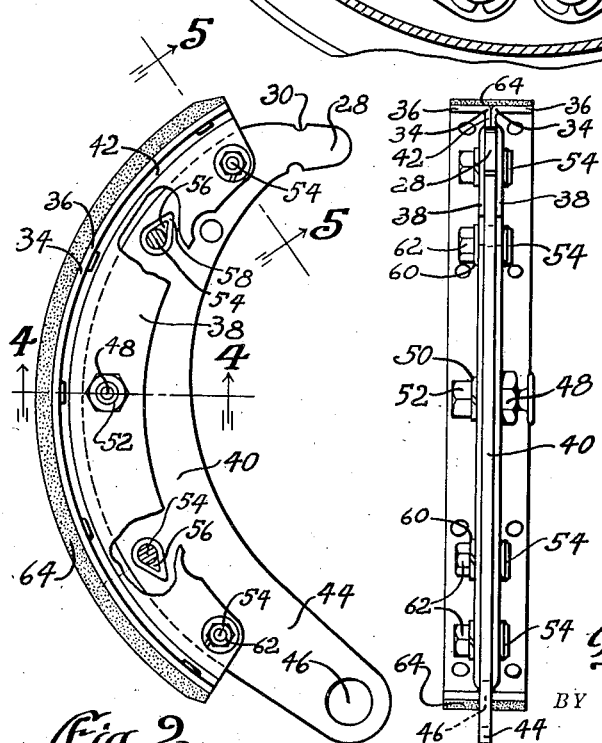
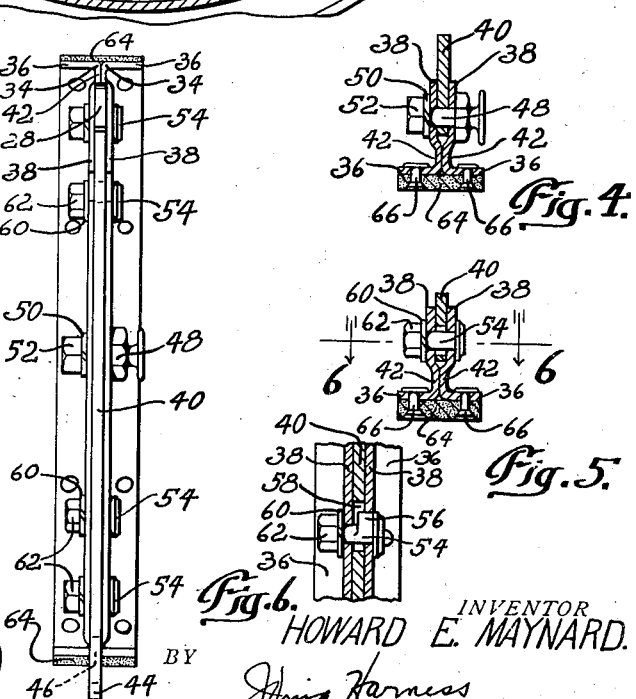
INVENTOR
HOWARD E. MAYNARD.
BY
  Irving Harness
                ATTORNEY Patented Aug. 11, 1931

1,818,565

UNITED STATES PATENT OFFICE

HOWARD E. MAYNARD, OF DETROIT, MICHIGAN, ASSIGNOR TO CHRYSLER CORPORATION, OF DETROIT, MICHIGAN, A CORPORATION OF DELAWARE

BRAKE SHOE

Application filed May 23, 1928. Serial No. 279,892.

This invention relates to brake shoes, and is illustrated as embodied in novel pressed metal shoes for an internal expanding automobile brake.

An important object of the invention is to form a shoe from pressed metal, the lining carrying portion being supported on a stiffening web and movable relative thereto, thus permitting the lining or friction material to conform to the inner periphery of the brake drum. Preferably the lining carrying portion is formed from two angle members arranged back to back with the stiffening member between the adjacent flanges of the angle members.

Other features of the invention relate to adjustable means for securing the two lining carrying members and the stiffening member together.

Other objects and advantages of the invention including various desirable details of construction, will be apparent from the following description of one illustrative embodiment shown in the accompanying drawings, in which:

Fig. 1 is a vertical section through the brake just inside the head of the drum, showing the shoes in side elevation and the operating mechanism in section.

Fig. 2 is a view taken at right angles to Fig. 3, showing the shoe in elevation.

Fig. 3 is a side view of Fig. 2.

Fig. 4 is a sectional view on line 4—4 of Fig. 2.

Fig. 5 is a sectional view on line 5—5 of Fig. 2.

Fig. 6 is a sectional view on line 6—6 of Fig. 5.

The brake illustrated comprises a drum 10, at the open side of which is a backing plate 12 and within the drum 10 are two brake shoes 14 and 16. The shoe 14 is pivoted as at 18 on the plate 12 and the other shoe 16 is pivoted as at 20.

The control for the shoes shown is of the hydraulic type operating by means such as a pair of oppositely movable pistons 22 reciprocating in a cylinder 24. The ends of the shoes, opposite their pivot points, engage the pistons 22. The brake is applied by applying a fluid pressure in the cylinder 24 between the two pistons so that movement of the piston forces the shoes 14 and 16 against the drum 10 against the resistance of a spring 26. The free ends of the shoes 14 and 16 are provided with piston engaging end portions 28 and grooves 30, the latter engaging flexible covers 32, enclosing the open ends of the cylinder 24.

The general construction of each brake shoe consists of a pair of angle members 34, each having a cylindrical lateral flange 36 and a radial flange 38, and a radially extending member 40. The angle members are formed cylindrical to fit the inner periphery of the brake drum. Adjacent the angle and on each radial flange 38 is a portion 42 stamped inwardly approximately one half the thickness of the member 40. This inwardly stamped portion stiffens the angle members and permits the angle members to be placed together at their outer edge, leaving a space between the radial flanges 38.

The member 40 is also arc shaped having its opposite ends extended beyond the opposite ends of the angle members, the upper end 28 to engage the piston 22 and the lower end 44 having an opening 46 to receive the pivot 18.

At the center of the shoe, a bolt 48 has been provided extending through the lateral flanges 38 and the member 40. A washer 50 and nut 52 secure the parts together. It will be understood that the angle members 34 are pivoted on the bolt 48, its opposite ends moving toward or away from the opposite ends of the member 40. At the opposite sides of the bolts 48 I have provided bolts 54 extending through the radial flanges 38. Enlarged portions 56 are formed at one side of the bolts 54 which fit openings in one of the flanges 38 to prevent turning.

Openings 58 are provided in the member 40 conforming generally to the shape of the bolt 54 and its enlarged portion, but is larger in diameter than the bolt to permit radial movement of the bolt. Washers 60 and nuts 62 on the bolts 54 draw the radial flanges into frictional engagement with the member 40. The washers 50 and 60 are shown as lock washers which resiliently urge the members into frictional engagement. A brake lining 64 has been shown secured to the flanges 36 of the angle member by rivets 66.

It will be understood that when the pistons 22 are moved outwardly the shoes pivot about the centers 18 and 20 toward the inner periphery of the brake drum 10. The angle members, carrying the brake lining, are pivoted on the bolt 48 and by such an arrangement the outer periphery thereof conforms to the inner periphery of the drum, thus contacting at all points equally on its contacting surface.

It will be obvious that various changes including the size and arrangement of parts may be made without departing from the spirit of my invention and it is not my intention to limit its scope other than by the terms of the appended claims.

What I claim is:

1. A brake shoe comprising a pair of angle members each having a cylindrical flange and a radial flange, arranged back to back with the outer edges of the radial flanges spaced apart, a stiffening member in the space between said radial flanges and pivotally connected to said angle members, said angle members being movable relative to each other and to the stiffening member.

2. A brake shoe comprising, in combination, a pair of pressed metal angle members arranged to form a circumferential lining supporting surface and a pair of radial flanges extended in spaced relation to each other throughout the lining supporting surface, a radially extending stiffening member between said flanges extending circumferentially beyond said lining supporting surface, and bolts extending through the radial flanges and said stiffening member to hold the three members in assembled relation but permitting limited relative movement of each member.

3. A brake shoe comprising, in combination, a pair of angle members each having a cylindrical flange and a radial flange arranged back to back, said radial flanges engaging each other at points adjacent the cylindrical flanges and spaced apart adjacent their outer edges, a stiffening member between said radial flanges extending circumferentially beyond said cylindrical flanges, and means for pivotally connecting said stiffening member to said angle members.

4. A brake shoe comprising, in combination, a pair of angle members each having a cylindrical flange and a radial flange arranged back to back, said radial flanges engaging each other at points adjacent the cylindrical flanges and spaced apart adjacent their outer edges, a stiffening member between said radial flanges extending circumferentially beyond said cylindrical flanges, means for pivotally connecting said stiffening members to said angle members, and means for varying the frictional resistance between said members.

5. A brake shoe comprising a cylindrical lining supporting surface, a radially extending stiffening member pivotally connected to said lining supporting surface, and means for varying the friction resistance between said stiffening member and said lining support.

6. A brake shoe comprising a cylindrical lining support, a pair of spaced radial flanges on said support, a stiffening member pivoted between said radial flanges and extending circumferentially beyond the opposite ends of said lining support, and means for varying the frictional resistance between said stiffening member and said radial flanges.

7. A brake shoe of pressed metal having a cylindrical portion and spaced radial flanges formed by arranging two angle members back to back, and a member pivoted between said flanges and extending beyond the opposite ends of said cylindrical portion.

8. A brake shoe of pressed metal having a cylindrical portion and spaced radial flanges formed by arranging two angle members back to back, a member pivoted between said flanges and extending beyond the opposite ends of said cylindrical portion, and a brake lining secured to the outer periphery of the cylindrical portion on the two angle members.

9. A brake shoe comprising, in combination, a pair of angle members, each having a cylindrical flange and a radial flange arranged with the radial flanges spaced apart, a stiffening member in the space between said radial flanges, a pin extending through said flanges and said stiffening member adjacent the center thereof, and means spaced from said pin for varying the frictional resistance between said stiffening member and said radial flanges.

10. A brake shoe comprising, in combination, a pair of angle members, each having a cylindrical flange and a radial flange arranged with the radial flanges spaced apart, a stiffening member in the space between said radial flanges, a pin extending through said flanges and said stiffening member, adjacent the center thereof, pins at the opposite sides of said central pin extending through said flanges and said stiffening member, means on said last named pins to prevent relative movement thereof with respect to one of said members, but free for relative movement with the other of said members.

11. A brake shoe of pressed metal having a cylindrical lining supporting surface and spaced radial flanges formed by arranging two angle members back to back, a member pivoted between said flanges, and a brake lining secured to the outer periphery of the cylindrical portion on the two angle members.

HOWARD E. MAYNARD.